US011571086B2

(12) United States Patent
Chu

(10) Patent No.: US 11,571,086 B2
(45) Date of Patent: Feb. 7, 2023

(54) THERMOMETER WITH USER SETTABLE MEMORY FUNCTIONS

(71) Applicant: Ewig Industries Macao Commercial Offshore Limited, Macau (CN)

(72) Inventor: Luk Wah Jackson Chu, Hong Kong (CN)

(73) Assignee: EWIG INDUSTRIES MACAO COMMERCIAL OFFSHORE LIMITED, Macau (CN)

( * ) Notice: Subject to any disclaimer, the term of this patent is extended or adjusted under 35 U.S.C. 154(b) by 868 days.

(21) Appl. No.: 16/440,703

(22) Filed: Jun. 13, 2019

(65) Prior Publication Data

US 2020/0214494 A1 Jul. 9, 2020

Related U.S. Application Data

(60) Provisional application No. 62/788,119, filed on Jan. 3, 2019.

(51) Int. Cl.
*G01K 1/02* (2021.01)
*A47J 36/32* (2006.01)
*G01K 1/024* (2021.01)
*G01K 1/04* (2006.01)

(52) U.S. Cl.
CPC ............... *A47J 36/32* (2013.01); *G01K 1/024* (2013.01); *A47J 2202/00* (2013.01); *G01K 1/045* (2013.01); *G01K 2207/06* (2013.01)

(58) Field of Classification Search
CPC ...... G01K 1/024; G01K 1/12; G01K 2207/06; G01K 2215/00

USPC .................................................. 374/149, 163
See application file for complete search history.

(56) References Cited

U.S. PATENT DOCUMENTS

| | | | | |
|---|---|---|---|---|
| 6,712,505 B2* | 3/2004 | Chapman | ............... | G01K 1/024 374/E1.004 |
| 7,104,682 B2* | 9/2006 | Harris, Jr. | ............... | G01K 13/00 374/208 |
| 7,201,099 B2* | 4/2007 | Harris, Jr. | ................ | G01K 1/02 374/E1.002 |
| 7,722,248 B1* | 5/2010 | Chapman | ............... | G01K 1/024 374/208 |
| 9,380,982 B2* | 7/2016 | Battista, Jr. | ............ | G16H 40/63 |
| 10,367,582 B2* | 7/2019 | Economy | ............. | H04B 10/808 |
| 2004/0131104 A1* | 7/2004 | Seferian | .................... | G01K 7/01 374/178 |
| 2004/0247015 A1* | 12/2004 | Wojan | .................... | G01K 13/00 374/E1.018 |

(Continued)

FOREIGN PATENT DOCUMENTS

JP 2943176 B2 * 8/1999

*Primary Examiner* — Gail Kaplan Verbitsky
(74) *Attorney, Agent, or Firm* — Lathrop GPM LLP

(57) ABSTRACT

A system and method for fast temperature measurement during a cooking process uses a high temperature thermometer with a user settable memory feature. The thermometer includes a processor and a memory for storing recommended safe cooking temperatures for a plurality of food items, for example, different meats. A plurality of keys on the thermometer provide an input mechanism for a user of the thermometer to select a type of food item being cooked and display the recommended safe cooking temperature, or to change the stored cooking temperature for a food item.

11 Claims, 6 Drawing Sheets

(56) References Cited

U.S. PATENT DOCUMENTS

| | | | | |
|---|---|---|---|---|
| 2006/0225443 | A1* | 10/2006 | Tamborra | G01K 3/04 |
| | | | | 62/157 |
| 2017/0122817 | A1* | 5/2017 | Willert | G01K 1/022 |
| 2017/0135159 | A1* | 5/2017 | Sorenson | H05B 3/70 |
| 2018/0375679 | A1* | 12/2018 | Lapsley | H04L 12/282 |
| 2019/0053332 | A1* | 2/2019 | Cheng | H05B 6/6435 |
| 2020/0129006 | A1* | 4/2020 | Nivala | G08B 25/10 |

\* cited by examiner

| Food | USDA Recommended Cooking Temperature |
|---|---|
| Fresh Beef, Veal, Lamb | |
|    Medium Rare | 145° F / 63° C |
|    Medium | 160° F / 71° C |
|    Well Done | 170° F / 75° C |
| Poultry | 165° F / 74° C |
| Pork | |
|    Fresh: Medium Rare | 145° F / 63° C plus 3-minute rest |
|    Fresh: Well Done | 160° F / 71° C |
|    Ham: Fresh/Cured (raw/partially cooked) | 145° F / 63° C |
|    Ham: Cured Fully Cooked (reheat) | 140° F / 60° C |
| Fish | 145° F / 63° C |
| Sausage | 165° F / 74° C |
| Eggs | 160° F / 71° C |

FIG. 1

THERMOMETER WITH USER SETTABLE MEMORY FUNCTIONS

FIELD OF THE INVENTION

The systems and methods described herein are in the field of food preparation and more specifically in the field of thermometers that provide user-settable memory functions.

BACKGROUND OF THE INVENTION

Instant-read thermometers are used to quickly and conveniently detect when food has reached a temperature during a cooking process at which it is safe to eat. Elevating food to at least a minimum cooking temperature is particularly important when cooking meat, poultry and eggs, for example, so that exposure to harmful bacteria and foodborne illnesses are eliminated.

Although many cooks have opinions on whether food is done cooking based on appearance and color, these indications are not always reliable. Studies have shown that the only way to tell if food is safe is by checking internal temperature with a food thermometer, yet only a small percentage of cooks regularly use thermometers to check food while it is cooking to determine doneness.

One of the factors that discourage cooks from using food thermometers is the need to remember or look up the different safe cooking temperatures for various types of food. The United States Department of Agriculture (USDA) has compiled charts listing safe cooking temperatures, an example of which is shown in the table of FIG. 1. This table shows that there is a considerable variation between safe temperatures for different types of food. This variation may be difficult for cooks to remember and contributes a disinclination to use thermometers during food preparation.

SUMMARY OF THE INVENTION

A system and method for fast temperature measurement during a cooking process uses a high temperature thermometer with a user settable memory feature. In an embodiment, an instant-read thermometer for detecting the temperature of a food item during cooking includes a housing having a memory storing recommended safe temperatures for one or more types of food items; a plurality of keys for selecting a type of food item; a display for displaying the recommended safe temperature for the selected type of food item and the current temperature of the food item; a processor operatively coupled with the memory, the plurality of keys and the display; and a temperature sensing probe operatively coupled to the housing and placeable at one or more locations relative to a food item for detecting the current temperature of the food item.

In a further embodiment, the plurality of keys further comprises a SET key and one or more selection keys for selecting a food item during cooking.

In yet another embodiment, the processor may be a microcontroller.

In another embodiment, a method of using an instant-read thermometer having a processor, a memory, a display and a plurality of keys, includes the steps of controlling the processor to enter a SET mode by pressing a first key of the plurality of keys; controlling the processor to display a saved temperature associated with a second key by pressing the second key; pressing one or more of the plurality of keys to control the processor to change the saved temperature; and controlling the processor to exit the SET mode by pressing the first key.

In a further embodiment, the method includes steps of controlling the processor to display a second saved temperature associated with a third key by pressing the third key; and pressing one or more of the plurality of keys to control the processor to change the second saved temperature associated with the third key.

In another embodiment, a method of using an instant-read thermometer with user-settable memory functions, where the thermometer includes a temperature sensing probe placeable at one or more locations relative to a food item for measuring a temperature of the food item, a memory storing one or more recommended safe temperatures associated with one or more types of food items, a plurality of keys, a display for displaying the recommended safe cooking temperature for an associated type of food item and a measured temperature of the food item, and a processor operatively coupled with the memory, the plurality of keys and the display, the method includes steps of placing the probe into contact with a food item; controlling the processor to display a saved recommended temperature associated with the food item by pressing a key; controlling the processor to display a current temperature of the food item as sensed by the probe; once the sensed temperature is higher or approaching a preset threshold lower than the saved recommended temperature, controlling the processor to provide an indication.

In any of the above embodiments, the method includes wirelessly coupling the thermometer with a smart device; and controlling the thermometer using the smart device.

In another embodiment, the plurality of keys further comprises a plurality of keys that may indicate types of food items and may also function as arrow keys.

In any of the above embodiments, the thermometer includes a communications interface and the processor communicates with a smart device wirelessly coupled to the thermometer by the communications interface.

In any of the above embodiments, an indication may include an audible alert or causing a displayed current temperature or indicia to flash.

In any of the above embodiments, the preset threshold is approximately 10 degrees F. or 5 degrees C.

BRIEF DESCRIPTION OF THE DRAWINGS

FIG. 1 is a table showing USDA safe cooking temperatures for various types of food.

DETAILED DESCRIPTION

Figure 2A:
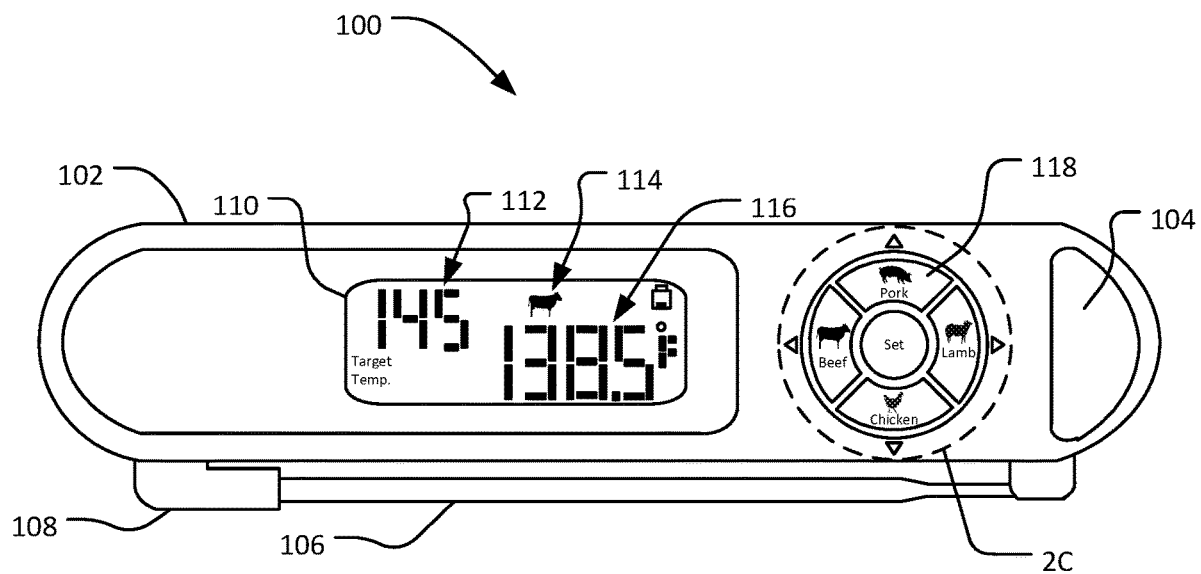
FIG. 2A depicts an instant-read thermometer with user settable memory functions.

An instant-read thermometer 100 with user settable memory functions is shown in FIG. 2A. Elements of the thermometer 100 are contained within housing 102. Although housing 102 is shown with a generally oblong shape with rounded ends, any suitable shape may be used. In an embodiment, an opening 104 is provided at one end of housing 102 so that thermometer may be hung on a hook, for example.

Figure 2B:
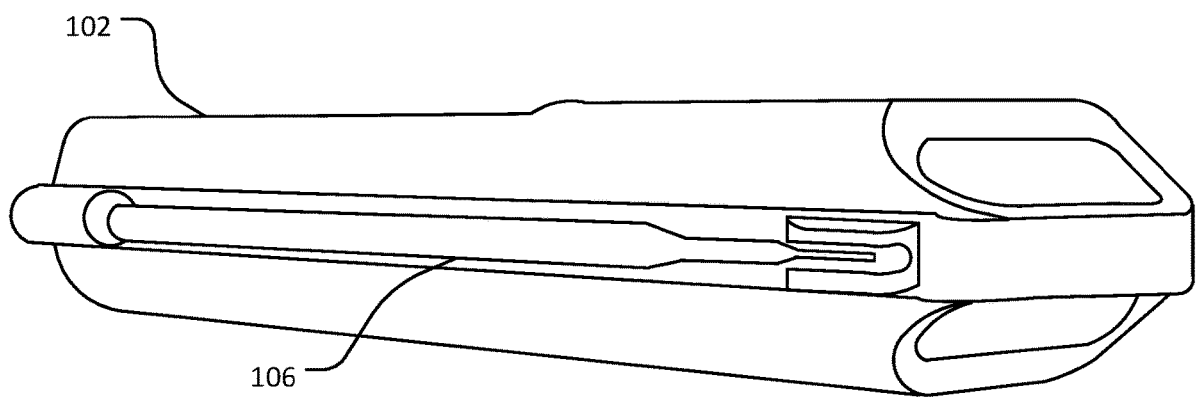
FIG. 2B depicts a side view of the thermometer of FIG. 2A.

A probe 106 is used to measure the temperature of a food item being cooked. It is mounted on one side of housing 102 by means of hinge 108. In FIGS. 2A and 2B, probe 106 is shown in a closed position, for example, flush against one side of housing 102. Hinge 108 allows probe 106 to be moved in an arc to any position 180 degrees from its closed position. A power switch (not shown) is located adjacent to hinge 108 such that closing probe 106 places thermometer 100 in a sleep mode.

To open probe 106, it may be pulled away from the housing laterally so that it extends from one end of housing 102 and may be placed in contact with a food item being cooked. Although the probe is shown mounted to a side of the housing, it may be located anywhere on the housing provided that the probe does not obscure certain portions of the housing when closed. In a further embodiment, probe 106 may be mounted in a permanently extended position on one end of the housing, or may be mounted in such a way that it may be enclosed within the housing when not in use.

Thermometer 100 also includes a display 110. Display 110 may represent several kinds of information, including a saved temperature 112 associated with a food item being cooked as selected by end user, a food type indicium 114 and a measured temperature 116. Although specific examples and arrangements of information on display 110 are shown, a variety of information and indicia may be arranged in any number of ways and display 110 is not limited to the examples shown in the figures.

Figure 2C:
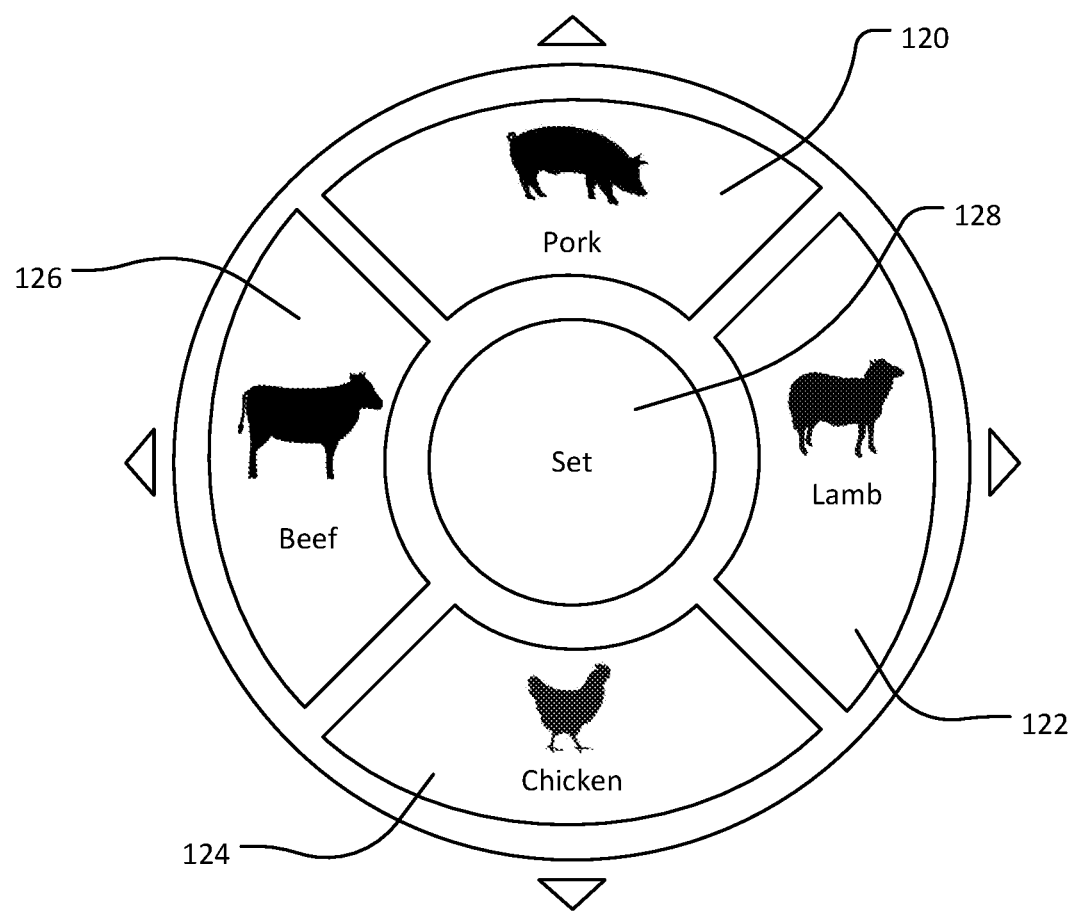
FIG. 2C depicts a close-up of a portion of the thermometer of FIG. 2A.

Keypad 118 is provided for a user to store or recall a saved temperature for a food item being cooked. In an embodiment as shown in FIG. 2C, five keys are provided. Memory keys 120, 122, 124 and 126 each indicate a type of food item and are arranged in a circle around a SET key 128. For example, memory key 120 features an indicium for pork, memory key 122 shows an indicium for lamb, memory key 124 for chicken and memory key 126 for beef. Although specific meats are shown, other types of meat, such as fish, or other types of food in general, such as eggs, may be indicated on memory keys 120, 122, 124 and 126. In a further embodiment, a different number of keys may be used, for example, three or six. Each of memory keys 120, 122, 124 and 126 also serve as arrow keys under certain conditions, as will be explained in more detail below.

In an embodiment, thermometer 100 includes a memory which stores one or more of the USDA recommended safe temperatures as shown in FIG. 1 as factory presets which may be recalled by pressing any of memory keys 120, 122, 124 or 126. A recalled temperature may be shown on display 110 at 112, for example. In a further embodiment, a user may change the saved temperature for a specific food item and then save it in the memory using a processer described in connection with FIG. 3.

Thermometer 100 may be used for temperature measurement on many different types of food or food preparation systems (such as in a sous-vide cooking application). When probe 106 is placed in contact with a food item being cooked, the temperature measured by probe 106 is shown on display 110 at 116. An indicium of a food item selected using one of keys 120, 122, 124 or 126 may be shown on display 110 at 114. This provides a way for a user of thermometer 100 to quickly and easily compare a saved temperature and a measured temperature to tell that a food item has been heated to a safe temperature. Optionally, an audible alert signaling correspondence between a saved temperature and the measured temperature may be provided when the food is done cooking.

Figure 4:
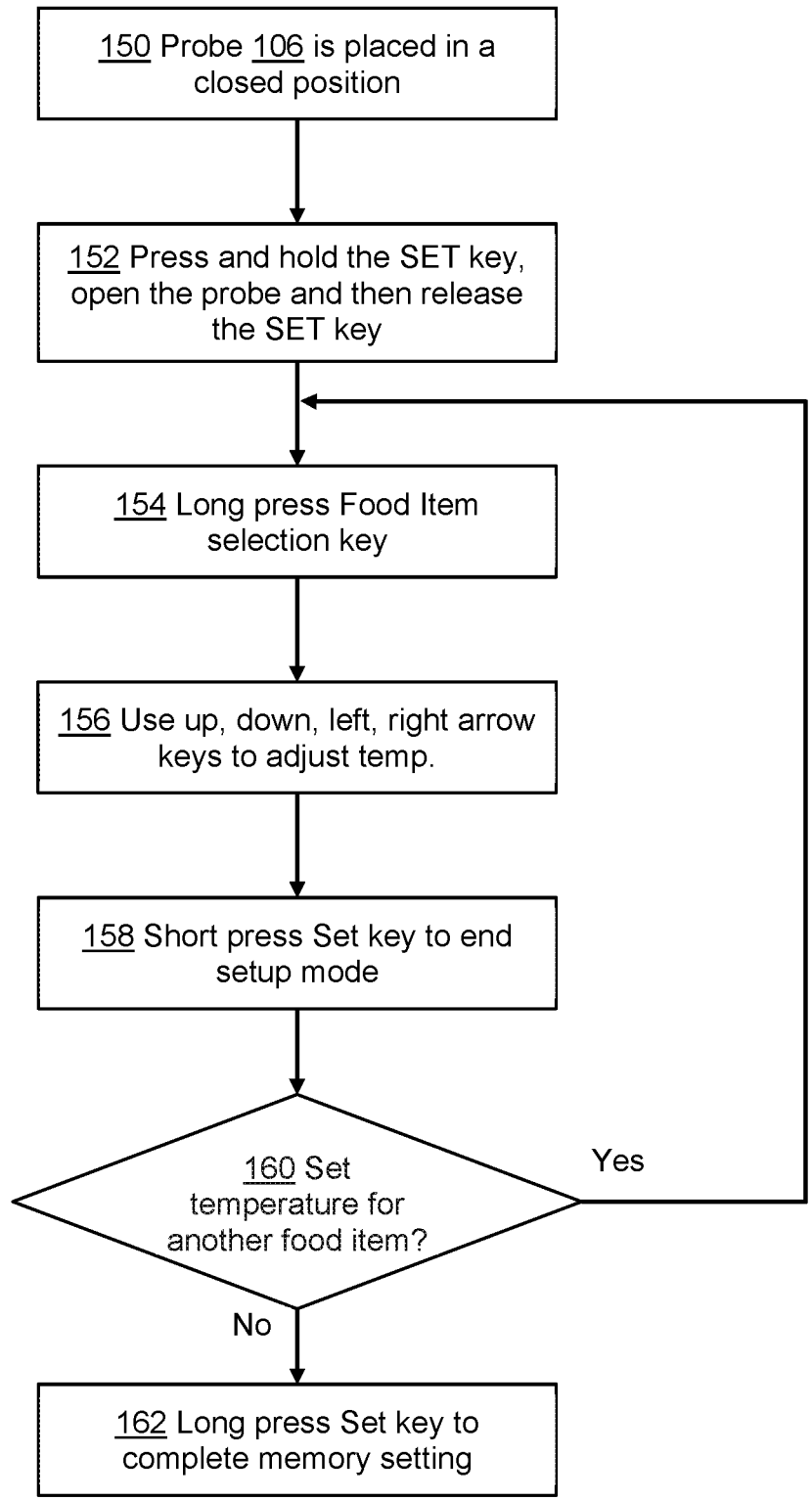
FIG. 4 is a flowchart of a method of using the thermometer of FIG. 2A.

In an embodiment, a user of thermometer 100 may save one or more preferred temperatures for various food items such as beef, pork, lamb and chicken as described below in connection with FIG. 4. Although memory keys 120, 122, 124 and 126 depict indicia representing various kinds of meat as shown in FIG. 2C, they may also include numbers or any other distinguishing symbols.

Figure 3:
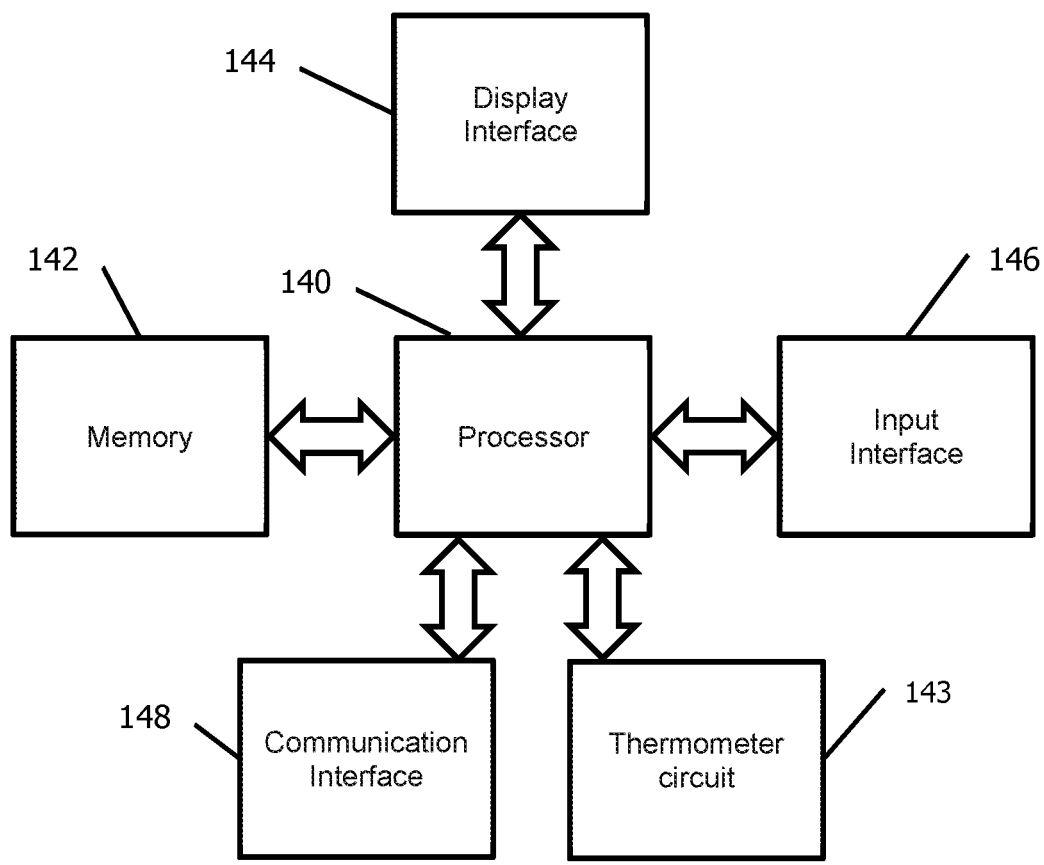
FIG. 3 is a block diagram of electronic circuitry of the thermometer of FIG. 2A.

A block diagram depicting internal components of housing 102 of FIG. 2A is shown in FIG. 3. A processor 140 may be any electronic circuitry that executes instructions in cooperation with other elements of thermometer 100 to accomplish functions. For example, processor 140 may be a microcontroller. Processor 140 is coupled to memory 142 which stores instructions for execution by processor 140, recommended saved temperatures as described above, and any other data or information required to accomplish the functions disclosed herein. Thermometer circuit 143 is coupled to probe 106 to measure the probe temperature and send the data to Processor 140. Display interface 144 provides a connection between processor 140 and display 110 of FIG. 2A while input interface 146 provides a connection between processor 140 and key pad 118 of FIG. 2C.

Communication interface 148 provides a wireless connection between thermometer 100 and another device. For example, communication interface 148 may be a built-in wireless transceiver that uses a communication protocol such as Wi-Fi, Bluetooth, BLE (Bluetooth Low Energy), Zigbee or any proprietary low energy RF platform, to connect thermometer 100 to a designated receiver unit, or user's smart device such as a smart device or tablet.

A number of functions are provided through communications interface 148, including but not limited to:

(a) Remotely monitoring the temperature of a food item. For example, in a sous-vide cooking application, a device probe (but not the electronics housing of the device) may remain submerged in water to measure the temperature the water pot for slow cooking, the electronics in the device will send alerts or notification through communications interface 148 to a designated receiver unit or smart device when the food is ready according to user's preference or setting in sous-vide cooking process;

(b) Setting a timer to alert the user when the timer reaches the target cooking time set by user. A smart device connected to the probe thermometer system may also send alerts or notification to the end user when the timer has counted down to zero according to user's timer setting;

(c) Data logging the measured temperature and transferring the data to smart devices as a record;

(d) Using an application on a smart device to save preferred cooking temperatures for the memory keys or other user defined meat types.

In an embodiment, thermometer 100 has preset USDA recommended temperatures for safe cooking temperatures for several food items as explained above. These preset temperatures may also be changed or configured by a user through either a smart device application, or by interaction with keypad 118 located directly on the thermometer 100. If temperatures are set with the application, once the thermometer is un-paired with the smart device, the thermometer may function independently without connecting, or being connected, to the smart device.

As shown in FIG. 2B, keys 120, 122, 124 and 126 each represent a type of meat, although other food item designations may be used. USDA recommended temperature settings for meats corresponding to keys 120, 122, 124 and 126 are preset during manufacture and saved in memory 142. An example mode of operation for changing the temperature setting for a given key using keypad 118 includes one or more of the following steps as shown in the flowchart of FIG. 4:

1. Step 150: Probe 106 is placed in a closed position. When probe 106 is placed in a closed position, the switch associated with hinge 108 causes thermometer 100 to be placed in sleep mode, which allows processor 140 to distinguish between a setting mode or memory recall mode. In an alternative embodiment, thermometer 100 may be placed in a sleep mode by another method, for example, a dedicated key.

2. Step 152: Press and hold SET key 128 and then open the probe to enter food memory setting mode. Release the SET key when the display of target temperature 112 is flashing. In an embodiment, an audible signal may also indicate that thermometer 100 is in a food memory setting mode.

3. Step 154: Long Press one of keys 120, 122, 124 or 126 to select a meat type. A "Long Press" of any key indicates that a user should press and hold the selected key for approximately 2-3 seconds. The selected meat is shown on the display at 114 with a signal, such as flashing of the meat indicia (for example, beef, pork, lamb or chicken) on the display. The currently saved temperature associated with the selected meat is also displayed at 112. In addition, an audible signal may be provided.

4. Step 156: Once flashing, the user interacts with keys 120, 122, 124 and 126 as up, down, left, or right arrow keys to adjust the target temperature 112 digit by digit.

5. Step 158: A Short press of SET key 128 will complete the setting for the meat type selected in step 152 and save the changed temperature in the memory, but device is still operating in setting mode. A "Short" Press of any key is approximately 1 second or less.

6. Step 160: User may set the target temperature for another meat type by returning to step 154.

7. Step 162: Long Press SET key 128 to exit memory setting mode. Indicia Display 114 and setting display 112 stop flashing. This step will force the device to quit the setting mode.

When using thermometer 100 to recall a saved temperature while cooking, whether a factory preset or one entered by the user, one or more of the following steps may be performed:

1. Probe 106 is placed in an open position.
2. Short press any one of keys 120, 122, 126 or 128 to select a preferred meat type.
3. Selected meat indicia will be displayed at 114.
4. Corresponding saved temperature will be displayed at 112.
5. The user inserts probe 106 into the food (or the probe is put into water for a sous-vide application), once the measured temperature is higher than the saved temperature or higher than a preset temperature (e.g., 10 degrees F., 5 degrees C., or other threshold value) lower than the saved temperature, food temperature reading 116 shall flash as a visible alert. In an embodiment, an audible alert may also be used.

In an embodiment, each key 120, 122, 124 or 126 may be associated with multiple temperatures for example, user-defined thresholds for beef may include settings for rare, medium-rare, medium, medium-well, well. These thresholds may be set using a variation of the sequence of key strokes described above, or by using an application on a smart device.

In a further embodiment, a given meat type may have user-set, or pre-configured, minimum temperatures for an associated meat as a safety mechanism that prevents the user from setting the meat below a safe cooking temperature for that meat. For example, a "chicken" key 124 may be associated with a threshold that is not user-configurable below 165 degrees Fahrenheit (the minimum safe cooking temperature for chicken).

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. An instant-read thermometer for detecting the temperature of a food item during cooking, comprising:
   a housing, said housing further comprising:
   a memory storing recommended safe temperatures for one or more types of food items;
   a plurality of keys for selecting a type of food item;
   a display for displaying the recommended safe temperature for the selected type of food item and the current temperature of the food item;
   a processor operatively coupled with the memory, the plurality of keys and the display; and
   a temperature sensing probe operatively coupled to the housing and placeable at one or more locations relative to a food item for detecting the current temperature of the food item
   the memory further storing instructions which, when executed by the processor, cause the processor to:
   enter a SET mode in response to a user pressing a first key of the plurality of keys;
   display a save temperature for a selected food item in response to a user pressing a second key of the plurality of keys;
   change the saved temperature in response to a user pressing one or more of the plurality of keys;
   store the changed temperature in the memory as a recommended safe temperature for the selected food item associated with second key;
   display a save temperature for a second selected food item in response to input from a third key and display an indicia representing the second selected food item;
   receive input from one or more keys to change the displayed temperature; and
   store the changed temperature in the memory as a recommended safe temperature for the second food item associated with the third key.

2. The thermometer of claim 1, wherein the housing further comprises a communications interface for wirelessly communicating with a smart device and the processor responds to input from the smart device to change temperatures stored in the memory.

3. The thermometer of claim 1, wherein the plurality of keys further comprises a SET key and one or more selection keys for selecting a food item during cooking.

4. The thermometer of claim 1, wherein the processor further comprises a microcontroller.

5. A method of using an instant-read thermometer with user-settable memory functions, said thermometer comprising a temperature sensing probe placeable at one or more locations relative to a food item for measuring a temperature of the food item, a memory storing one or more recommended safe temperatures associated with one or more types of food items, a plurality of keys, a display for displaying the recommended safe cooking temperature for an associated type of food item and a measured temperature of the food item, and a processor operatively coupled with the memory, the plurality of keys and the display, the processor adapted and configured to:
receive input from a first key to enter a temperature setting mode;
receive input from a second key indicating a selected food item and display an indicia representing the selected food item;
access the memory to retrieve a recommended safe cooking temperature for the selected food item and display the retrieved temperature;
receive input from one or more keys to change the displayed temperature to a changed temperature;
receive input from the first key to save the changed temperature in the memory in association with the selected food item;
receive input from a third key indicating a second selected food item and display an indicia representing the second selected food item;
access the memory to retrieve a recommended safe cooking temperature for the second selected food item and display the retrieved temperature;
receive input from one or more keys to change the displayed temperature; and
receive input from the first key to exit a temperature setting mode.

6. The method of claim 5 wherein the plurality of keys further comprises third, fourth and fifth keys that indicate a type of food item and the second, third, fourth and fifth keys also function as arrow keys.

7. The method of claim 5, wherein the thermometer further comprises a communications interface and the processor communicates with a smart device wirelessly coupled to the thermometer by the communications interface.

8. The method of claim 5, further comprising:
placing the probe into contact with a food item;
controlling the processor to display a saved recommended temperature associated with the food item by pressing a key;
controlling the processor to display a current temperature of the food item as sensed by the probe;
once the sensed temperature is higher or approaching a preset threshold lower than the saved recommended temperature, controlling the processor to provide an indication.

9. The method of claim 8, further comprising:
wirelessly coupling the thermometer with a smart device; and
controlling the thermometer using the smart device.

10. The method of claim 8, wherein the plurality of keys further comprises a plurality of keys that indicate a type of food item.

11. The method of claim 8, wherein the indication comprises an audible alert or causing the displayed current temperature to flash.

\* \* \* \* \*